United States Patent
Ludwig et al.

(10) Patent No.: US 8,542,584 B2
(45) Date of Patent: Sep. 24, 2013

(54) PARTITIONING ENTITY AND METHOD FOR PARTITIONING CAPACITY

(75) Inventors: Reiner Ludwig, Hurtgenwald (DE); Hannes Ekström, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 198 days.

(21) Appl. No.: 12/993,385

(22) PCT Filed: Sep. 4, 2008

(86) PCT No.: PCT/EP2008/061678
§ 371 (c)(1),
(2), (4) Date: May 9, 2011

(87) PCT Pub. No.: WO2009/141016
PCT Pub. Date: Nov. 26, 2009

(65) Prior Publication Data
US 2011/0199900 A1    Aug. 18, 2011

Related U.S. Application Data

(60) Provisional application No. 61/054,508, filed on May 20, 2008.

(51) Int. Cl.
*H04L 1/00*    (2006.01)
(52) U.S. Cl.
USPC ........................................................ 370/230
(58) Field of Classification Search
USPC .................... 370/229–235, 252, 328–339
See application file for complete search history.

(56) References Cited

U.S. PATENT DOCUMENTS

| | | | |
|---|---|---|---|
| 7,006,437 B2* | 2/2006 | Ogier et al. | 370/230.1 |
| 7,263,063 B2* | 8/2007 | Sastry et al. | 370/235 |
| 8,223,758 B2* | 7/2012 | Eriksson | 370/358 |
| 2003/0007453 A1 | 1/2003 | Ogier et al. | |
| 2008/0186862 A1* | 8/2008 | Corbett et al. | 370/237 |
| 2009/0067335 A1* | 3/2009 | Pelletier et al. | 370/238 |
| 2010/0208614 A1* | 8/2010 | Harmatos | 370/253 |

FOREIGN PATENT DOCUMENTS

JP    2005244513 A    9/2005
WO    WO 2007/038956    *    4/2007

OTHER PUBLICATIONS

Wongthavarawat, K. et al. "Packet Scheduling for QoS Support in IEEE 802.16 Broadband Wireless Access Systems." International Journal of Communication Systems, 2003, pp. 81-96.
3rd Generation Partnership Project, "Quality of Services(QoS) concept and architecture," Technical Specification Group Services and System Aspects, Mar. 2006, pp. 17-26, 3GPP TS 23.107 V6.4.0 (Release 6).

* cited by examiner

*Primary Examiner* — Frank Duong
(74) *Attorney, Agent, or Firm* — Coats & Bennett, P.L.L.C.

(57) ABSTRACT

The present invention relates to a partitioning entity and a method for partitioning capacity in a communication network to avoid starvation of certain data traffic and to support services with different characteristics. The method of partitioning capacity comprises assigning communication links to a group associated with a time-varying group capacity to form a group of communication links. The group comprises a first sub-group and at least a second sub-group of communication links. Further, the method comprises allocating a non-zero fraction of the time-varying group capacity to the first sub-group of communication links of the group.

20 Claims, 8 Drawing Sheets

PARTITIONING ENTITY AND METHOD FOR PARTITIONING CAPACITY

TECHNICAL FIELD

The present invention relates to a partitioning entity and a method for partitioning capacity in a communication network using communication links to which capacity can be allocated.

BACKGROUND

In communication networks, such as packet-switched networks, data traffic may be classified differently according to required or ordered service. A known mechanism for classification is quality of service (QoS).

In the internet, the most widespread IP-based QoS mechanism is based on the architecture for Differentiated Services described in "An Architecture for Differentiated Services" by S. Blake at al, RFC 2475 published by the Internet Engineering Task Force (IETF). In this architecture, data traffic is classified into different classes, where each class receives a different treatment at the nodes in the network. To which class a particular packet belongs is indicated by a DSCP-field in the IP-header of the packet, for example. Intermediate nodes in the network hence read the DSCP-field and deduce which treatment the packet gets.

Further, "Assured Forwarding PHB Group" by J. Heinanen, RFC 2597 also published by the IETF describes a class of traffic treatments called Assured Forwarding (AF). Here, nodes implementing the AF treatment have to allocate a configurable, minimum amount of forwarding resources, such as buffer space and bandwidth, to each implemented AF class and each class should be serviced in a manner to achieve the configured service rate, such as bandwidth, over both small and large time scales. In detail, three parameters may be defined, such as priority indicating the priority of the data traffic, minimum rate indicating the minimum rate that should be given to this class of data traffic and maximum rate indicating the maximum rate that should be given to this class of data traffic.

Typically, the minimum rates of all classes are serviced first in descending priority order. If there is bandwidth left after this, data traffic may be serviced in descending priority order up to the maximum rate for each AF class.

In such conventional fixed networks the bit rate of the outgoing link is constant, i.e., does not vary over time.

Another QoS framework has been discussed in 3GPP to provide QoS in Long Term Evolution (LTE) systems. For example, the 3GPP specification TS 23.401 "General Packet Radio Service (GPRS) Enhancements for Evolved Universal Terrestrial Radio Access Network (E-UTRAN) Access", Version 8.1.0, March 2008, describes bearer-level parameters, such as QoS class identifier (QCI), that are signalled to the LTE radio access network (RAN) from a core network. According to this specification, a QCI is a scalar that is used as a reference to access node-specific parameters that control bearer level packet forwarding treatment, e.g. scheduling weights, admission thresholds, queue management thresholds, link layer protocol configuration, etc. and that have been pre-configured by the operator owning the access node, e.g. eNodeB.

3GPP has standardized the characteristics that the LTE RAN should provide for 9 of possible 256 QCIs, referred to as standardized QCIs, which may be found in the above mentioned 3GPP specification TS 23.401 describing the Evolved Packet System (EPS). Characteristics specified are Resource Type, Priority, Packet Delay Budget (PDB) and Packet Loss Rate (PLR), wherein values of the characteristics for the QCIs are given in the 3GPP specification TS 23.401, which is incorporated by reference.

In this QoS framework, the Priority levels shall be used to differentiate between service data flow (SDF) aggregates of the same user equipment (UE), and it shall also be used to differentiate between SDF aggregates from different UEs. Via its QCI an SDF aggregate is associated with a Priority level and a PDB. In the 3GPP specification, scheduling between different SDF aggregates shall primarily be based on the PDB. If the target set by the PDB can no longer be met for one or more SDF aggregates across all UEs that have sufficient radio channel quality then priority shall be used as follows: A scheduler shall meet the PDB of SDF aggregates on Priority level N in preference to meeting the PDB of SDF aggregates on Priority level N+1.

In the following, it should be noted that there is a notion about an absolute priority of Priority level N over N+1 when the PDB deadline is approached.

The 3GPP specification TS 23.401 differentiates between Guaranteed Bit-Rate (GBR) QCIs and non-GBR QCIs, wherein bearers associated with a GBR QCI have an additional parameter called GBR signalled to the RAN at the time of bearer setup. For such bearers, the RAN has the possibility to perform admission control based on the value of the GBR field. For bearers associated with a non-GBR QCI, no GBR value is signalled to the RAN at the time of bearer setup.

LTE systems will offer operators a high system capacity both in terms of throughput and number of users that can be supported simultaneously. These capabilities give operators the opportunity to offer a wide range of services and operators are expected to use the QoS mechanisms defined in 3GPP to differentiate the service quality and characteristics between their offered services.

However, with the conventional QoS framework presented above, traffic related to a QCI associated with a high priority, i.e. low Priority value, may starve out traffic from lower priority traffic. In other words, since the higher priority traffic is serviced by the scheduler with absolute priority, all resources or capacity will be given to that traffic at high load situations and there will be nothing left for lower priority traffic.

Therefore, strict priority scheduling with greedy traffic can cause starvation of lower priority traffic at high system loads.

In particular, in view of the specifics of wireless links, e.g. the time varying nature of the bandwidth of wireless links, simply applying the above described aspects for fixed networks is not sufficient, since starvation of lower priority traffic may not be avoided, especially when served traffic decreases and overhead increases in a mobile environment with users with bad radio conditions.

US 2003/0007453 A1 describes scheduling mechanisms for use in mobile ad hoc wireless networks for achieving a differentiated services per-hop behaviour. The mechanism attains a per-hop behaviour for a plurality of classes of packet traffic in a multi-hop network. A nominal departure rate is allocated by DS-routers to each class, e.q. service class, based on an anticipated behaviour of a communication link, wherein the anticipated behaviour may be called nominal bandwidth.

The document XP-002516156 by Kitti Wongthavarawat et al. describes packet scheduling for QoS support in iEEE 802.16 broadband wireless access systems. A scheduling algorithm and admission control policy for a broadband wireless access standard is described, wherein QoS support is provided to different traffic classes. Further, it is described that according to uplink packet scheduling (UPS) principle, bandwidth allocation flow follows a strict priority, wherein traffic policing is introduced to force the connection's bandwidth demand to stay within a traffic contract to prevent higher priority connections from using bandwidths more than their allocation.

SUMMARY

Therefore, the need arises for a method and an entity provide a mechanism to avoid starvation of certain data traffic and to support services with different characteristics, in particular in a mobile environment.

This is achieved by the independent claims. Advantageous embodiments are described in the dependent claims.

According to an embodiment, a method for partitioning a capacity in a communication network comprises assigning communication links to a group associated with a time-varying group capacity to form a group of communication links. The group comprises a first sub-group and at least a second sub-group of the communication links. The method further comprises allocating a non-zero fraction of the time-varying group capacity to the first sub-group of communication links of the group.

Accordingly, data traffic using the first sub-group of communication links may not starve out, since a fraction of the time-varying group capacity will always be associated with the first sub-group. In other words, even if the capacity varies with time, a specific relative part of the capacity is available for data traffic over the communication links of the first sub-group. Therefore, different services may be maintained at the same time even in a mobile environment with time-varying capacity.

According to another embodiment, a partitioning entity of a communication network comprises a controller for assigning communication links to a group associated with a time-varying group capacity to form a group of communication links. The group comprises a first sub-group and at least a second sub-group of the communication links. Further, the partitioning entity comprises an allocator for allocating a non-zero fraction of said time-varying group capacity to the first sub-group of communication links of said group. Accordingly, data traffic over communication links of the first sub-group may not starve out, since a fraction of capacity will always be associated with the first sub-group. In other words, even if the capacity varies with time, a specific relative part of the capacity is available for data traffic over the communication links of the first sub-group. Therefore, for example, a control node may be provided with the functionality to or incorporating the partitioning entity to support different services at the same time.

According to another embodiment, a computer program may be provided including instructions adapted to cause data processing means to carry out the method with the above features.

DETAILED DESCRIPTION OF THE PREFERRED EMBODIMENTS

Figure 1:
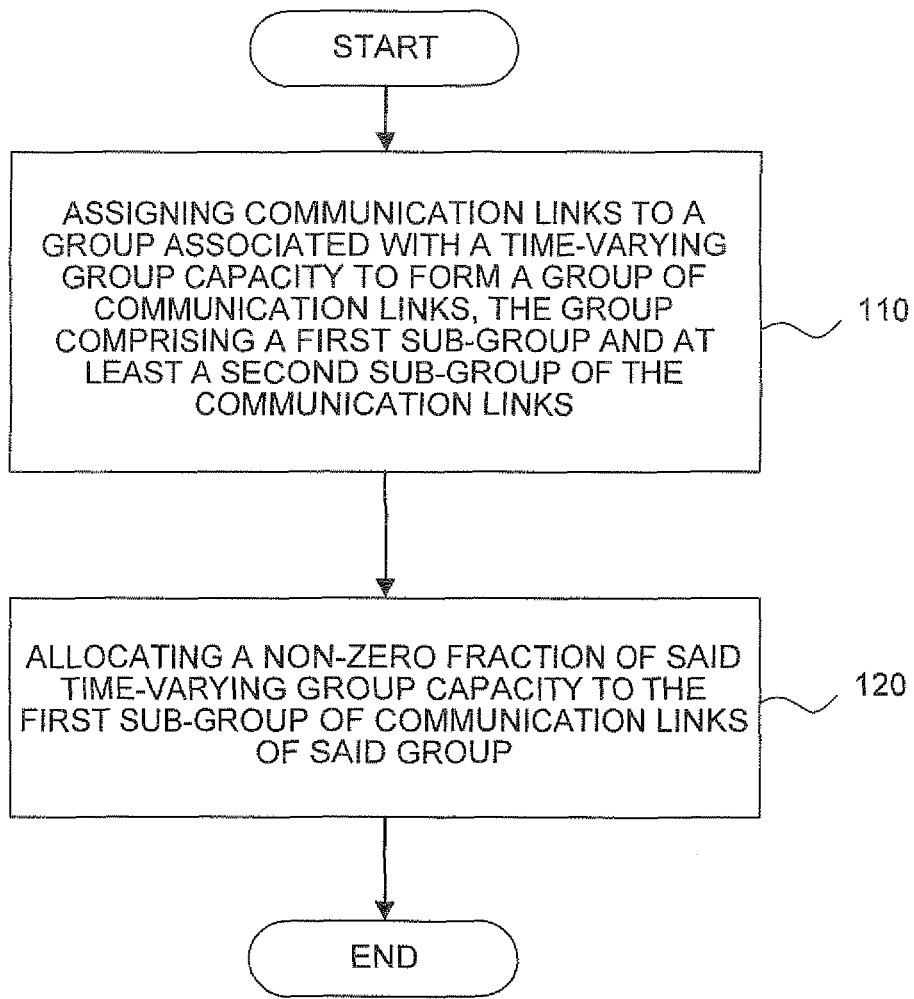
FIG. 1 shows a flowchart of a method for partitioning capacity according to an embodiment of the invention.

Preferred embodiments of the invention are described with reference to the figures. It is noted that the following description contains examples only and should not be construed as limiting the invention.

Embodiments of the invention generally relate to partitioning capacity, and particularly, to allocate a fraction or predetermined amount of capacity of a communication network to different communication links or combinations of those links, i.e. sub-groups or groups, so that requirements in capacity for different services in a network can be met.

It is noted that reference will be made to specific technologies and standards in the following, such as 3GPP TS 23.401, but such references only serve to indicate preferred examples and are in no way limiting. Rather, the present invention can be generally applied in the context of any communication network that provides for the use of communication links, such as bearers, which may be allocated with various amounts of capacity to support different services associated with different data traffic. However, it is noted that EPS systems are a preferred application of the invention.

Communication links within the meaning of the present specification are links between one or more radio terminals or user equipments (UE) and one or more network nodes, such as a control node of a radio access network, e.g. a radio base station (RBS).

A communication link, such as a bearer, is an identifiable logical channel for transporting data to and from a radio terminal or network node. As herein discussed, a certain amount or fraction of capacity, e.g. bit rate, is allocated to one or more communication links so that data traffic may be transmitted over one or more communication links. In more detail, a communication link may be characterized by one or more parameters, such as QCI or Guaranteed Bit Rate (GBR), as mentioned above, as well as PLMN-ID and Allocation Retention Priority (ARP), which will be discussed in more detail below. For example, it may be preferable to provide a service requiring a GBR, such as conversational voice, over one or more communication links characterized by a GBR parameter.

Capacity indicates an amount of data that can be sent or processed within a given period of time. For example, capacity may be expressed as a bit rate. It is noted that even if a certain bit rate or capacity is available or guaranteed for a service between a network node and a radio terminal, there can be periods of complete communication interruption due to environmental circumstances, for example a mobile phone is entering an area of non-coverage, such as a tunnel. Nonetheless, the network will always control its resources in such a way that the allocated bit rate should be usable for transmission of data traffic.

Although in the context of this specification capacity is mostly used for downlink capacity related to a cell, the underlying idea of partitioning capacity is also applicable to other system resources, such as a base-band processing capacity or physical resource blocks available for scheduling in a radio base station.

In the following, an embodiment of the invention will be described with regard to FIG. 1.

FIG. 1 illustrates a flowchart of a method for partitioning capacity according to an embodiment of the invention, comprising an assigning step 110 and an allocating step 120.

In detail, in step 110, communication links are assigned to a group associated with a time-varying group capacity to form a group of communication links. The group comprises a first sub-group and at least a second sub-group of communication links. For example, a group formed of one or more communication links is associated with a partition, e.g. a non-GBR partition. Similarly, the sub-groups may be associated with smaller partitions, wherein a partition is related to a part of the system capacity that has been reserved to a certain type of traffic.

The time-varying group capacity constitutes at least a part of the typically time-varying total capacity in a communication network and may be associated with a specific group of communication links having specific characteristics.

The total capacity of the communication network is a function of all radio resources and all active users' locations, which will be described in more detail with respect to FIG. 5, and may be regarded as the instantaneous available total bit rate.

In the second step 120, a non-zero fraction of the time-varying group capacity is allocated to, i.e. reserved for, the first sub-group of communication links of said group. The fraction value is usually constant in a certain time period and may be expressed as a percentage of the time-varying group capacity. However, it is also feasible that the fraction value is changed by the network operator, for example, according to a change in service agreement. An example with a fraction having a value of 30% is described with respect to FIG. 5, where 30% of the time-varying group capacity is allocated to the non-GBR partition 1. Consequently, since the total capacity is always assumed to be larger than a predetermined group capacity, there will be no starving out of traffic using the non-GBR partition 1. For more details, it is referred to the discussion with respect to FIG. 5.

According to an example, the method further comprises allocating a second non-zero fraction of the time-varying group capacity to the second sub-group of communication links. Accordingly, two sub-groups of communication links may each be associated with a specific fraction of capacity above zero so that even if the capacity varies with time the ratio of the fractions of the capacity stays the same.

According to another example, the above method further comprises allocating a predetermined group capacity to a second group of communication links. Accordingly, in contrast to allocating capacity in relative terms, as described above, capacity may also be allocated in absolute terms so that a specific service may be provided with a predetermined reserved bit rate, for example. In particular, time sensitive services, such as conversational voice or conversational video with live streaming may require a guaranteed bit rate to maintain the expected quality.

According to another example, the predetermined group capacity is limited by a defined threshold. Accordingly, the load of data traffic with, for example, a Guaranteed Bit Rate (GBR) may be limited to a certain threshold, which may be defined as the maximum aggregated GBR of all communication links of the second group.

According to another example, capacity which is not allocated the second group is available for allocation to the first group. Accordingly, after allocating a predetermined group capacity to the second group, the remaining capacity of the network may be used for the first group. Further, although the remaining capacity may vary with time, data traffic associated with the first sub-group may not starve out and the remaining capacity may fully be used by communication links of the first group.

According to another example, the method further comprises allocating a portion of the predetermined group capacity to at least one third sub-group of communication links, wherein said portion of said predetermined group capacity corresponds to a specified absolute amount of the predetermined group capacity. Accordingly, the predetermined group capacity allocated to a second group of communication links may be partitioned so that multiple partitions with GBR may be defined, for example. Therefore, two or more services requiring a guaranteed bit rate, such as conversational voice and conversational video, may be realized at the same time.

According to another example, the time-varying group capacity corresponds to the difference between a total capacity and the predetermined group capacity. Accordingly, the total capacity of the network is available for usage by different services, such as the services mentioned above, so that the total capacity is efficiently distributed.

According to another example, the method further comprises utilizing a part of the predetermined group capacity by communication links of the first group, wherein the utilized part corresponds to the difference between data traffic over communication links of the second group and the predetermined group capacity. Accordingly, since the load of GBR traffic, for example, in the network is usually also time-varying, e.g. a voice call is established or released (hang up), a part of the predetermined group capacity that is not needed for the current load of the GBR traffic, may then be available for the data traffic on the communication links of the first group, e.g. non-GBR traffic. Therefore, unused predetermined group capacity may be used by other services, such as non-GBR services like video buffered streaming and TCP-based services, e.g. world wide web, e-mail, chat, FTP, file sharing, etc.

According to another example, a communication link is associated with at least one parameter and the method further comprises assigning the communication link to one of the sub-groups based upon the parameter. Accordingly, communication links may be flexibly grouped or selected according to one parameter at one point in time and at a different point in time according to another parameter so that sub-groups and their association with a partition of the capacity can be defined/re-defined easily and quickly. Further, it is possible to associate a communication link with a network operator or a QCI.

According to another example, communication links assigned to the first group are not associated with a Guaranteed Bit Rate and communication links assigned to the second group are associated with a Guaranteed Bit Rate (GBR). Accordingly, different services with different characteristics may use different communication links according to their bit rate requirements.

According to another example, the capacity is dependent on network resources and the location of mobile stations using the communication network, wherein the network resources comprise at least one of radio resources, processing resources and resource blocks. Accordingly, when knowing the network resources and the location or movement of mobile stations, the capacity of the network may be derived for the current point in time or approximated for a later point in time.

According to another example, the allocating step is performed dynamically. Further, it may also be possible to perform the allocating step repeatedly at predetermined time intervals or based on changes in the capacity. Accordingly, since the capacity of the network may change with time, by dynamically allocating the non-zero fraction or the second non-zero fraction of the time-varying group capacity, the allocated amount of capacity may change in absolute terms according to the changes of the total capacity of the network so that the partitioning of the capacity may be updated.

According to another example, the communication network is a packet-switched mobile network. Accordingly, different services having different characteristics may be used in a packet-switched mobile environment.

Figure 2:
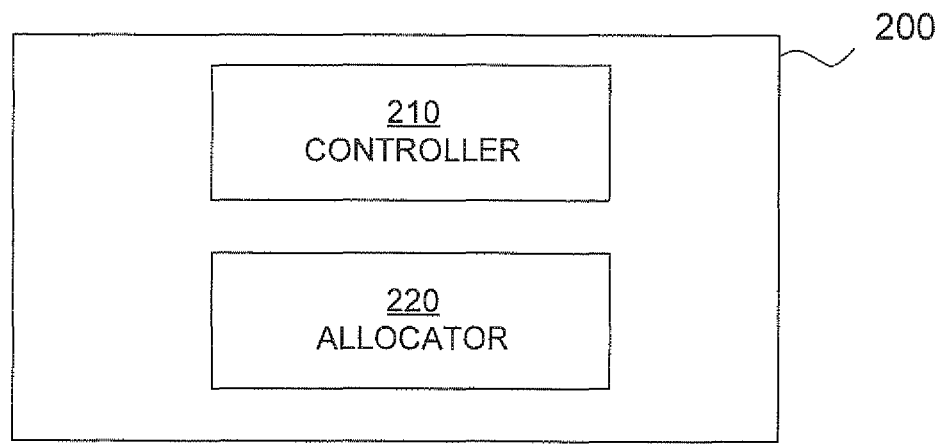
FIG. 2 illustrates a partitioning entity according to an embodiment of the invention.

FIG. 2 illustrates a schematic representation of a partitioning entity, which may be adapted to carry out steps of the methods herein described.

As can be seen from FIG. 2, the partitioning entity 200 comprises a controller 210 and an allocator 220, which may be configured to exchange data with each other.

The controller 210 assigns communication links to a group associated with the time-varying group capacity to form a group of communication links. For example, the controller 210 selects communication links having the same or similar characteristics, e.g. having the same parameter. In an example, all non-GBR bearers may be selected to form a first group, which may again be subdivided according to other parameters, e.g. the QCI parameter, to form a first and second sub-group of bearers, which are shown as non-GBR partition 1 and non-GBR partition 2 in FIG. 5.

The discussed functions of the controller 210 may be realized by a hardware arrangement, such as by hardwired circuits, or ASICs (application specific integrated circuits) or software or any suitable combination of the above. An implementation example is given later with respect to FIG. 8.

The allocator 220 allocates a non-zero fraction of the time-varying group capacity to the first sub-group of communication links of the group. For example, the non-zero fraction may be a percentage, such as 30% for the non-GBR partition 1 in FIG. 5. That is, the allocator 220 may monitor or receive information about the total capacity and time-varying group capacity and allocate, for example, 30% of the time-varying group capacity to the first-group constituting the non-GBR partition 1 in FIG. 5. Since the time-varying group capacity varies with time, the allocator 220 may repeat the allocation at a later point in time or in predetermined time intervals so that the same fraction of the available time-varying group capacity can be allocated dynamically, which however may be different from the previous allocation in absolute terms.

This function of the allocator 220 may also be realized by hardware or software, similarly to the function of the controller described above, and it is feasible that the functions of the controller 210 and the allocator 220 are realized by one hardware arrangement or software or suitable combination.

In one example, the partitioning entity 200 may form part of a control node, such as a radio base station (RBS), or alternatively, the functions of the two elements 210 and 220 may be incorporated in the control node of a radio access network. The described functions can be implemented by hardware or software executed in a processing system of the control node, similar to the system which will be described with respect to FIG. 8. Furthermore, distributing the different functions of the elements 210 and 220 between different nodes is also possible.

Further, the control node may have a scheduler or different schedulers for uplink and downlink and may comprise an admission controller. Via interfaces on the radio side, towards one or more core networks and towards other control nodes, the control node may receive data for radio transmission as well as admission requests and requests for scheduling of traffic.

In the following, another flowchart of a more detailed method for partitioning capacity will be described with regard to FIG. 3.

In addition to the group of communication links, discussed with respect to FIG. 1, which will be called the first group in the following, a second group of communication links is described with respect to FIG. 3.

Figure 3:
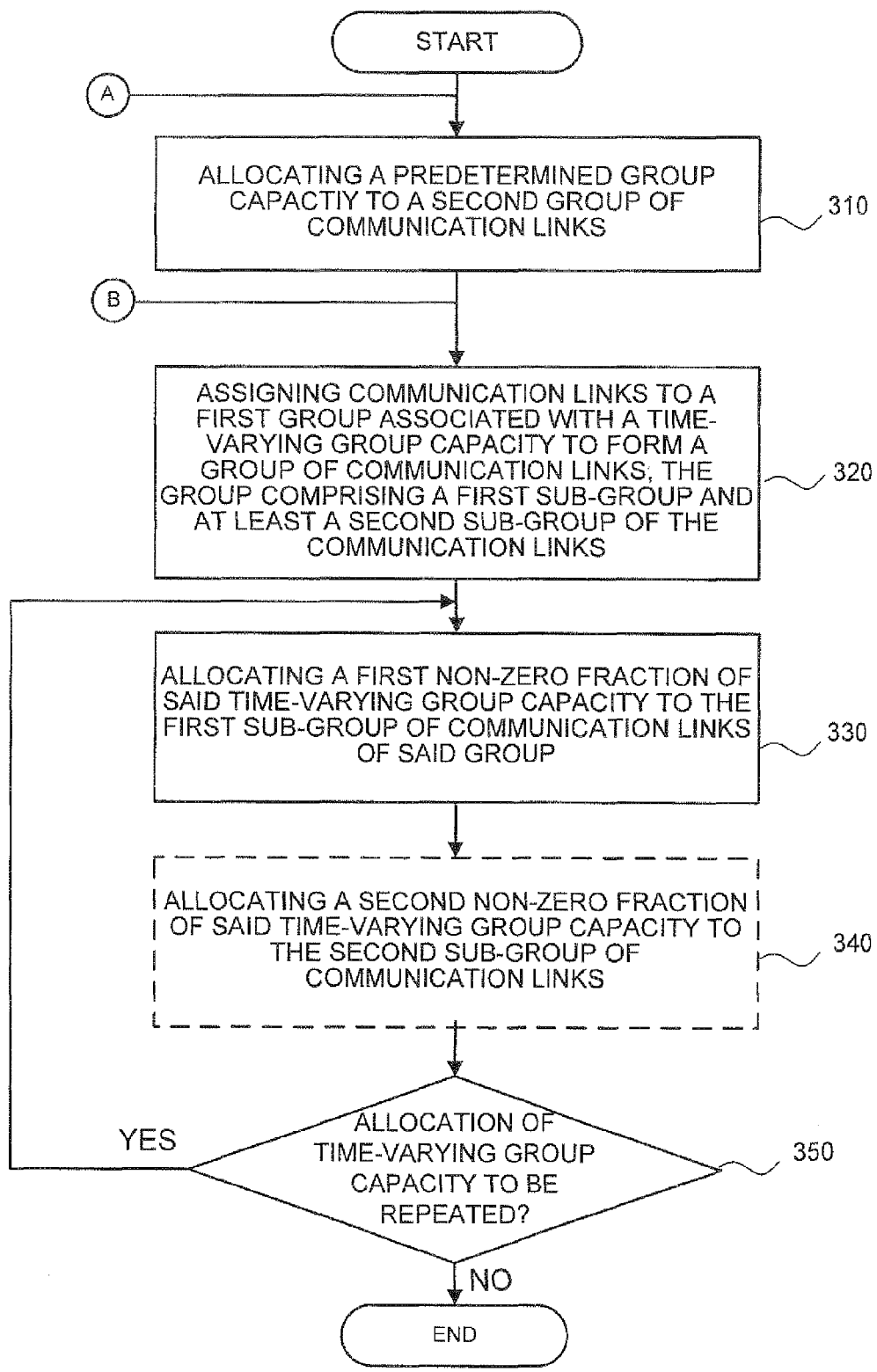
FIG. 3 illustrates a flowchart of another method for partitioning capacity according to another embodiment of the invention.

In detail, in step 310 of the flowchart of FIG. 3, a predetermined group capacity is allocated to the second group of communication links. This may be performed by the allocator 220. In the context of this specification, predetermined is to be understood as specified, absolute or fixed amount. In other words, the allocated predetermined group capacity is usually not varying with time and may be limited by a defined threshold.

For example, the predetermined group capacity corresponds to the difference between the total capacity and the time-varying group capacity. Thus, the amount of predetermined group capacity set, defines the amount of available time-varying group capacity.

In the subsequent step 320, other communication links are assigned to a first group associated with the time-varying group capacity. This step basically corresponds to step 110, which has been discussed in detail with respect to FIG. 1.

It is noted that, even so it is not shown in FIG. 3, the communication links of step 310, may be communication links assigned to the second group, which is a group associated with the predetermined group capacity so that the predetermined group capacity can be allocated to the communication links of a second group in step 310.

In contrast to allocating a predetermined group capacity, as discussed in step 310, a non-zero fraction of the time-varying group capacity is allocated to the first sub-group of communication links in step 330, similar to previously described step 120.

Optionally, step 330 may be followed by a step 340, in which a second non-zero fraction of the time-varying group capacity is allocated to a second sub-group of communication links.

According to this example, three partitions are generated, namely a partition associated with the second group and two partitions associated with the first and second sub-groups, respectively.

It is noted that the capacity associated with the partition associated with the second group in FIG. 3 is fixed, i.e. a specified amount, and the other two partitions are associated with only fractions of time-varying group capacity, i.e. their available bit rate is varying with time and thus also the allocated amounts of capacity are varying but their relative percentage of the available bit rate is fixed. Therefore, the two partitions associated with the two sub-groups are defined in relative terms. It is understood that the method is not limited to one or two sub-groups and the same advantages may be achieved with more sub-groups.

As discussed above, since the first group is associated with a time-varying group capacity, of which a fraction is allocated, the allocated amount corresponding to the fraction is also varying with time so that it may be necessary to repeat the allocating step(s) of non-zero fraction(s) from time to time, as indicated in step 350. For example, the step of allocating the first non-zero fraction or the step of allocating the second non-zero fraction or both may be dynamically performed or may be repeated at predetermined time intervals. Furthermore, the total capacity may be approximated or monitored and based on changes in this capacity, e.g. admission of a new communication link, the allocation may be repeated, which is indicated with "YES" in FIG. 3 so that the process returns to step 330.

Figure 4:
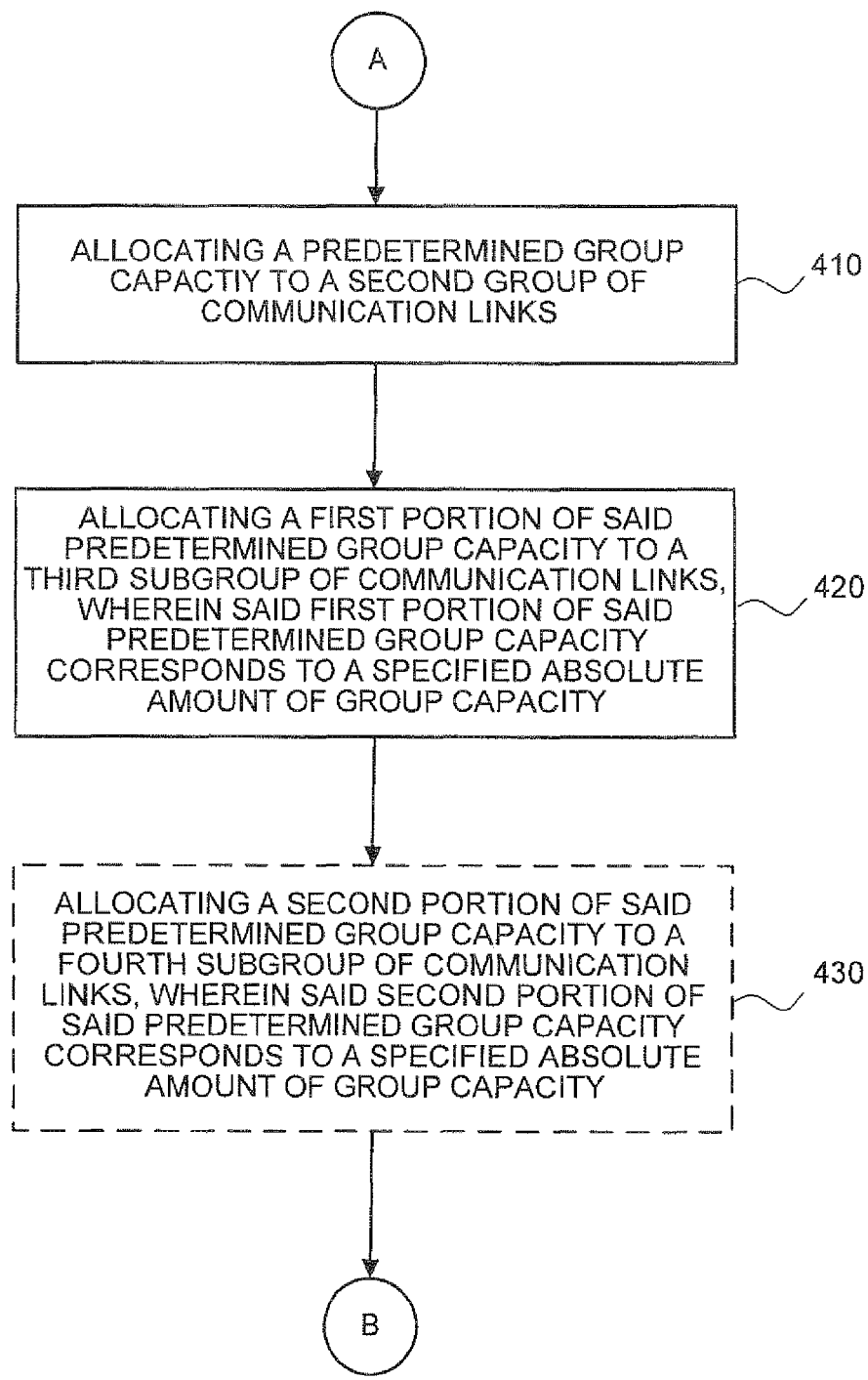
FIG. 4 illustrates steps of another method for partitioning capacity according to another embodiment of the invention.

In FIG. 4, another method for partitioning capacity is illustrated. In detail, steps are described that may be integrated or combined with the methods discussed with respect to the flowcharts of FIGS. 1 and 3.

In step 410, a predetermined group capacity is allocated to a second group of communication links, similar to step 310, and it is referred to FIG. 3 for more details.

Subsequently, in step 420 the predetermined group capacity may be further partitioned, namely a first portion of said predetermined group capacity may be allocated to a third sub-group of communication links, wherein the portion of the predetermined group capacity corresponds to a specified absolute amount of said predetermined group capacity.

Similarly, in another embodiment, as indicated by the dashed box of step 430, a second portion of the predetermined group capacity may be allocated to a fourth sub-group of communication links.

Clearly the discussed embodiments are not limited to the above, but also more sub-groups of communication links may be defined to which other portions of predetermined group capacity can be allocated.

As indicated in FIGS. 3 and 4 by the letters A and B, the described steps 410, 420 and 430 may replace step 310 in FIG. 3 so that steps 410, 420 and 430 may be performed before 310, 330, 340 and 350.

Furthermore, the steps 410, 420 and 430 of FIG. 4 may also be combined with the method of FIG. 1, and may be performed before steps 110 and 120 or subsequently to these steps.

The skilled person may also realize several other possibilities of arranging the order of the steps to achieve the herein discussed advantages.

In the following, the above discussed embodiments are described in more detail by referring to concrete examples illustrated in FIGS. 5, 6 and 7.

Figure 5:
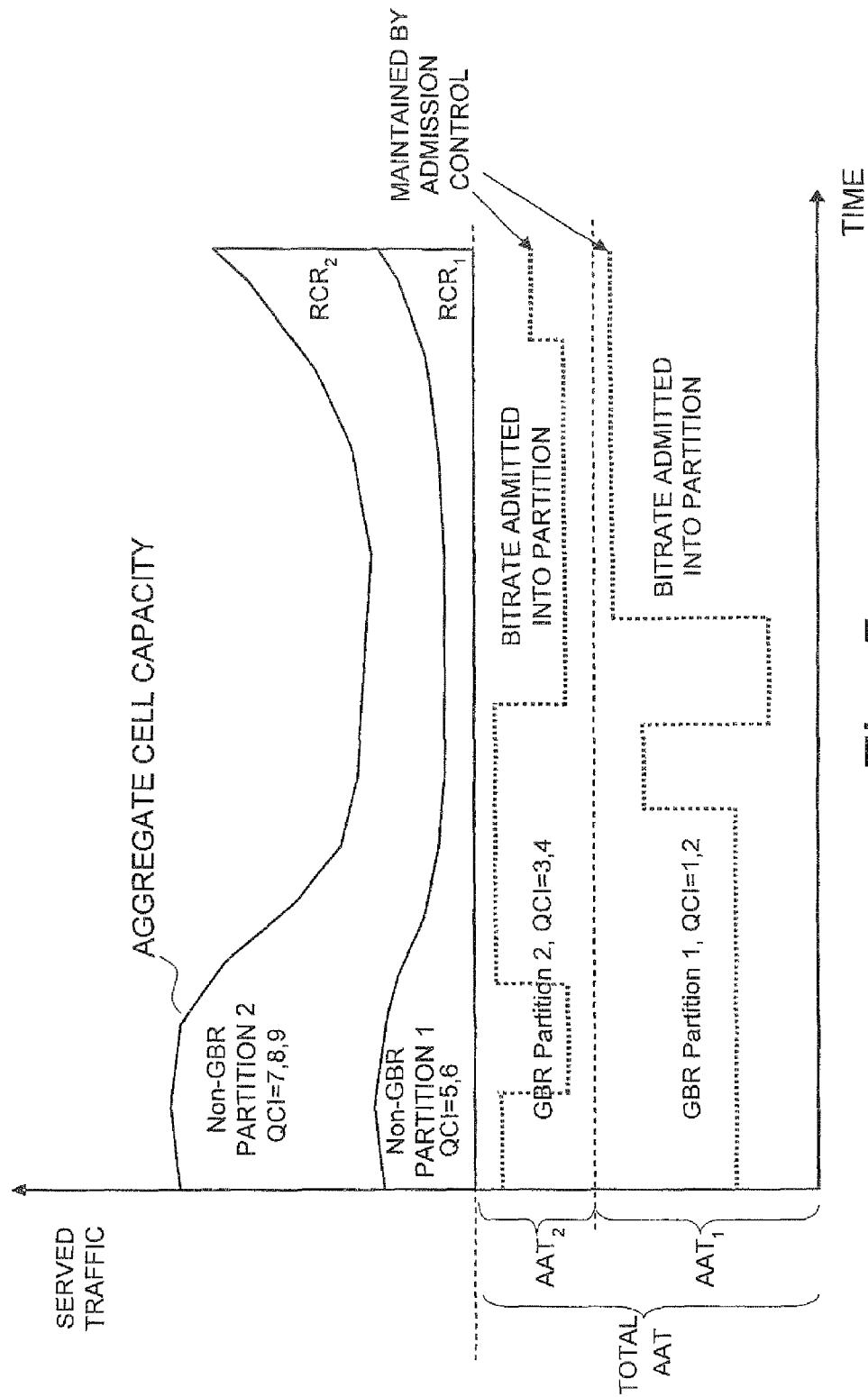
FIG. 5 illustrates a diagram for explaining embodiments of the invention.

FIG. 5 illustrates partitioning of the total capacity. In brief, the total capacity is first partitioned into GBR and non-GBR capacity and then the non-GBR capacity is further partitioned into two separate smaller partitions with different relative committed rates (RCR) associated with two sub-groups, i.e. two different fractions, and the GBR capacity is further partitioned into two partitions with two different absolute admission thresholds (AAT).

In detail, FIG. 5 illustrates the aggregate served traffic in a cell over time. As can be seen, the total capacity of the cell, i.e., the amount of served traffic, varies over time. The time variation of the served traffic may be the result of different processes. Primarily, time-variation may be caused by different radio channel quality of different served users. For example, when the majority of the served users has bad radio channel quality, the amount of served traffic will be lower than if the majority of the served users has good radio channel quality. This is because the internal functions of the radio base station, such as link adaptation, increase the overhead (lower modulation and stronger forward error correction) to transmit user data traffic per time unit to users with bad radio conditions. Therefore, the time-varying capacity is a characteristic of cellular networks that is different from fixed networks.

In general, the capacity is a function of the network resources and the location of mobile stations using the radio access network, wherein the network resources comprise radio resources, processing resources and resource blocks, as will be described in more detail in the following.

As already mentioned, different partitions are depicted in FIG. 5, wherein a partition may be regarded as a part of the system capacity or resources that has been "reserved" to a certain type of traffic.

In line with the 3GPP standard differentiating between GBR and non-GBR traffic, it is differentiated between GBR and non-GBR partitions in FIG. 5, which may be used to serve the respective traffic types. In this example, traffic is mapped onto partitions based on the bearer-level QCI, but different mappings with different parameters or a combination of parameters is possible, which will be discussed further below.

In this and the following examples, communication links are referred to as bearers. Some bearers assigned to the first group associated with the non-GBR partition carry traffic that does not have a guaranteed bit rate (non-GBR), thus having a varying bit rate, and other bearers assigned to a second group associated with the GBR partition carry traffic with a guaranteed bit rate (GBR).

GBR bearers, i.e. bearers of the second group, can be associated with an admission control function, which may be used to limit the load of GBR traffic over the GBR bearers, and thereby limit the capacity used by such traffic. Admission control is depicted in FIG. 5 by the dashed lines (small dashes), indicating the bit rate admitted into the partition by admission control.

In FIG. 5, the two GBR-partitions, GBR partition 1 and GBR partition 2, are defined by two Absolute Admission Thresholds (AAT), namely $AAT_1$ and $AAT_2$, and are separated by the horizontal dashed line. The AAT may be defined as the maximum aggregated GBR of all bearers that are admitted into the GBR partition. The aggregated GBR is the sum of the GBR, possibly multiplied by an activity factor $\leq 1$ of all admitted bearers. AAT is defined in absolute terms, in contrast to RCR, which is defined in relative terms and will be discussed later. Here, the total AAT is always lower than the minimum capacity, i.e. the lowest time-varying total capacity.

Therefore, since the capacity associated with the GBR partition is the predetermined group capacity mentioned above, the predetermined group capacity may be limited by a defined threshold.

An operator may define multiple GBR partitions, two in FIG. 5, in which case the sum of the individual partitions' AAT constitute the total AAT, namely in FIG. 5 the sum of $AAT_1$ and $AAT_2$. This then defines the maximum load that can be induced onto the system by the GBR traffic. The remainder of capacity may be left for non-GBR traffic.

In general, capacity which is not allocated to the second group associated with the GBR partition, is available for allocation to the first group associated with the non-GBR partition. Note that the load of the GBR traffic is time-varying and that the total AAT only defines the maximum of this load. That is, at any given time, a part of the capacity (the predetermined group capacity) of the total AAT is used by the GBR traffic and unused GBR capacity is available for non-GBR traffic, which will be described in detail with respect to FIG. 7 below.

Unused GBR capacity and used GBR capacity are shown in FIG. 5 in the two GBR partitions 1 and 2 by the dashed line (small dashes), indicating the bit rate admitted into the partition by admission control.

As described above with respect to the example shown in FIG. 5, once the GBR traffic has been served, the remainder of the capacity is left for non-GBR traffic. This remainder is typically time-varying and may be defined as time-varying group capacity. In other words, the time-varying group capacity corresponds to the difference between the total capacity and the capacity used by GBR traffic, e.g. the predetermined group capacity if GBR traffic uses up all of the allocated predetermined group capacity.

As can be seen in FIG. 5, the total capacity is typically not constant over time, since the total cell capacity varies over time and the load of the GBR traffic also varies over time. Note that the GBR capacity that is unused by the GBR traffic may be added to the non-GBR capacity, as described above.

The remainder of the capacity, i.e. the time-varying group capacity, may be divided into non-GBR partitions, e.g. non-GBR partition 1 and non-GBR partition 2 in the example shown in FIG. 5. Given the time-varying nature of the non-GBR capacity, such non-GBR partitions are defined in relative terms, for example by the relative committed rate (RCR) as shown in FIG. 5.

The RCR may be defined as a percentage of the total non-GBR capacity that may be given to a partition and each non-GBR partition is associated with one RCA in FIG. 5, namely by $RCR_1$ and $RCR_2$. The sum of the RCRs of all non-GBR partitions should not exceed 100%. In the example of FIG. 5, the $RCR_1$ is 30% and the $RCR_2$ is 70%. The relative committed rate may thus be regarded as a relative committed capacity.

In case there is not sufficient load for a certain partition to fully use its RCR, i.e. there is capacity over the bearers left, other non-GBR partitions may be served above their RCRs. The RCR only defines the minimum level of service that may be given to a non-GBR partition.

Similarly, each non-GBR partition may be associated with a relative peak rate (RPR) defining the maximum part or fraction of the non-GBR capacity that the partition may use.

The definition of a partition in relative terms, e.g. the RCR and RPR, may also be used in a general case, when a system only defines non-GBR partitions, similar to the embodiment described with respect to FIG. 1. The RCR and RPR may also be used as minimum and maximum levels, respectively, of the non-zero fractions described above.

GBR and non-GBR partitions can be combined and the total non-GBR capacity can be defined as the difference between two typically time-varying quantities, namely the total GBR load and the total cell capacity.

As described above, the RCR and RPR may be defined as a percentage of the cell capacity currently not used by GBR traffic. However, there may be cases where a too high data rate may not be appropriate.

For instance, an operator may want to limit the capacity of a partition even at times when the system is otherwise empty. One such example may be the throughput of a partition carrying peer-2-peer traffic. Even at times of low traffic, the operator may want to limit the throughput since users downloading lots of peer-2-peer traffic may not have signed up for a "too good" service performance. This motivates the need for RPR.

In such a case, when defining RCR and RPR as a percentage and the partition is the only one with load in the system, the RCR and RPR is per definition 100%.

To limit the capacity of a partition, the following two mechanisms may be used.

In the first mechanism, the base station may estimate the total cell capacity by measuring the amount of resources, e.g. resource blocks, that remain unused. Then a model may be used to translate this amount of resources into a capacity, e.g. in terms of throughput. For example, input to this model may be either configured via an O&M system, e.g. one resource block corresponds on average to 50 kbps, or the model may be adapted automatically based on measurements in the cell, e.g. over the last 24 hours the average effective rate per resource block in this cell may be 45 kbps, which may then be used in the model when calculating the total capacity. Accordingly, the radio base station may take a decision regarding the capacity, when the total capacity is not known, by using a model to calculate the capacity.

The better the network resources and locations of the UEs are known, the better the capacity may be approximated, since it is a function of the network resources and the location of UEs using the radio access network.

Further, in a second mechanism, which may also be suitable when the base station is unable to calculate the total cell capacity due to lack of traffic to schedule, for example, absolute thresholds to define the partitions may be used. In this case also a non-GBR partition can be defined by an absolute threshold which defines the maximum rate that this partition should be serviced with. For example, when unable to calculate the total cell capacity, service partition A may be provided with a maximum of 5 Mbps.

Previously, the partition parameters, e.g., RCR, RPR, AAT, etc. have been described with respect to FIG. 5 to be constant. However, configuration of the partition parameters may also be possibly controlled from a management plane such as an O&M system. For example, assuming that a new bearer is established in the example of FIG. 5 that is associated with a GBR parameter, $AAT_1$ and $AAT_2$ should be changed to allow traffic for the new service on the new established bearer. Similarly, also the RCRs in FIG. 5 may be changed to different percentages, when an additional non-GBR bearer is established.

As can be seen in the example of FIG. 5, different QCI parameters are mapped to different partitions. These QCI parameters are not necessarily connected to the standarized QCIs of 3GPP TS 23.401 but may be defined differently.

In general, a communication link, e.g. a bearer, is associated with at least one parameter and the communication link may be assigned to one of the sub-groups of communication links mapped to one of the partitions, based upon this parameter. Alternatively or additionally to the example of FIG. 5, the parameters used may be the following PLMN-ID, Allocation Retention Priority (ARP), etc.

That is, a communication link may be associated with the PLMN-ID (public land mobile network identifier) to point out the group or sub-group for a certain communication link, i.e. the partition for a certain bearer. For example, it may be useful in certain network sharing scenarios, where multiple operators invest in a common communication network, and operate that network together while each of the operators has at least one unique PLMN-ID, that partitioning may be used to split the network capacity between the operators. Hence, the PLMN-ID could in such a scenario be one input which is used to determine to which partition a certain bearer is mapped.

Further, a signal sent from a control node may modify the partition onto which certain traffic is mapped. As described above, the mapping of traffic onto a certain partition in the RAN may depend on at least one of the parameters QCI, ARP and PLMN-ID. If one of these parameters is modified for an existing bearer, the RAN may change the partition onto which the traffic is mapped.

Here, the value of ARP indicates a priority of allocation and retention, i.e. serves as an element in a decision on whether a bearer establishment/modification request can be accepted or needs to be rejected in case of resource limitations. The value of ARP can also be used to decide which bearers to drop during expected resource limitation, e.g. at handover. The different parameters, such as ARP and QCI are also discussed in more detail in 3GPP TS 23.401.

Similarly, data traffic may also be associated with at least one parameter. For example, data traffic is associated with a QCI indicating the characteristics of a service. In detail, using the destination IP address of a packet, a table may be used to associate the IP address with a QCI reflecting the service or service agreement between the operator and the user so that the data traffic may be transmitted over a bearer associated with the same QCI according to the required characteristics of the QCI.

In this and the following examples the amount of traffic is described as bit rate, however, other quantities may be determined to measure and specify the amount of traffic. For example, it may in some implementations be easier if numbers of resource blocks are specified which can be scheduled for a partition in a transmission time interval. In this case it is not required to measure bit rates but numbers of blocks can be counted instead, thus constituting a simple and effective implementation.

Although this and the following examples are described in the context of the system resource "downlink capacity", the described partitioning may also be applicable to other system resources, such as base-band processing capacity or physical resource blocks available for scheduling in the radio base station, which may include processing for scheduling, channel coding/decoding, link-layer protocol procedures, etc. This may be especially useful if the bottleneck is not in the radio interface but in the processing capacity of the transmitter, e.g. in the baseband.

For example, the processing capacity may limit the amount of data which can be transmitted on the radio interface, e.g. if the scheduler in the transmitter can process only a limited number of resource blocks. Therefore, it is understood that the herein described "partitioning of capacity" is not limited to downlink capacity or processing capacity.

Additionally, partitioning of capacity may be useful in the uplink from the UE to the RAN. In particular, this may be an option if a node in the RAN, such as a radio base station, schedules the traffic in the uplink, e.g. according to requests from UE to send an amount of data on a communication link, e.g. a bearer, with a specified quality of service.

Figure 6:
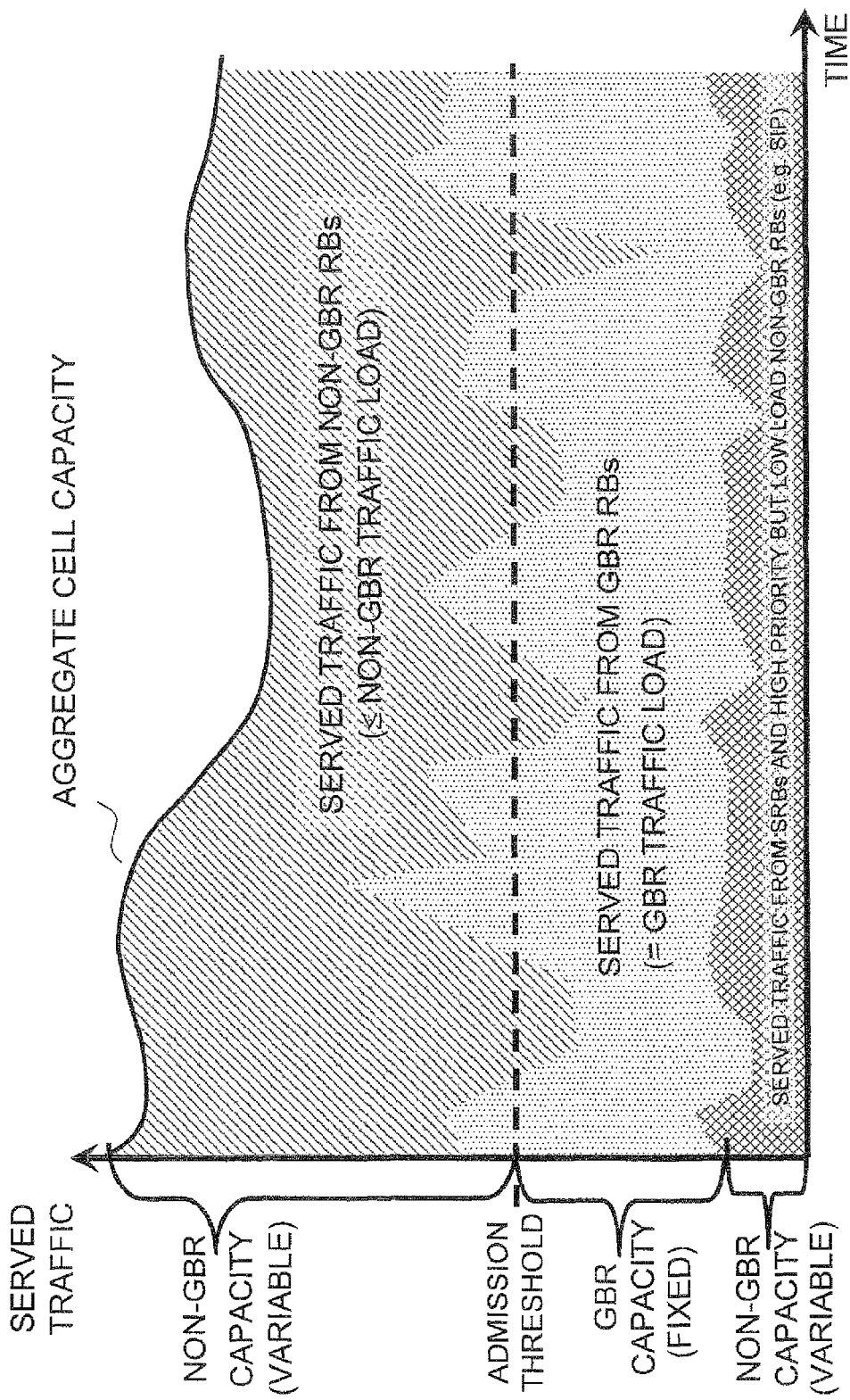
FIG. 6 illustrates another diagram for explaining embodiments of the invention.

FIG. 6 illustrates a further concrete example of partitioning a cell capacity between the served traffic over a period of time. Traffic from GBR bearers, also called GBR radio bearers (RB), which is shown dotted, is admitted until the admission threshold. As indicated, it is possible that the GBR traffic exceeds the admission threshold for short periods of time while the threshold is met if averaged in time.

As discussed above, if the traffic of the GBR bearers is below the threshold the corresponding capacity can be used by non-GBR bearers (hatched). A further partition (cross hatched) is used for signalling and other high priority traffic. Although in the present example, signalling is performed over non-GBR bearers, the priority of signalling may be set so high that time sensitive signalling receives enough capacity.

According to the 3GPP standard, radio bearers are the entities to carry traffic in an LTE system.

In the following, further examples of capacity allocation which can be ensured by traffic conditioning and scheduling are described with respect to FIG. 7.

Similarly to FIGS. 5 and 6 variations of the aggregate cell capacity over time are illustrated. It is shown in FIG. 7 that further partitioning of traffic is possible. In particular, the GBR partition can be subdivided into different sub-groups which preferably receive guaranteed traffic assignments, e.g. specific amounts of traffic.

Figure 7:
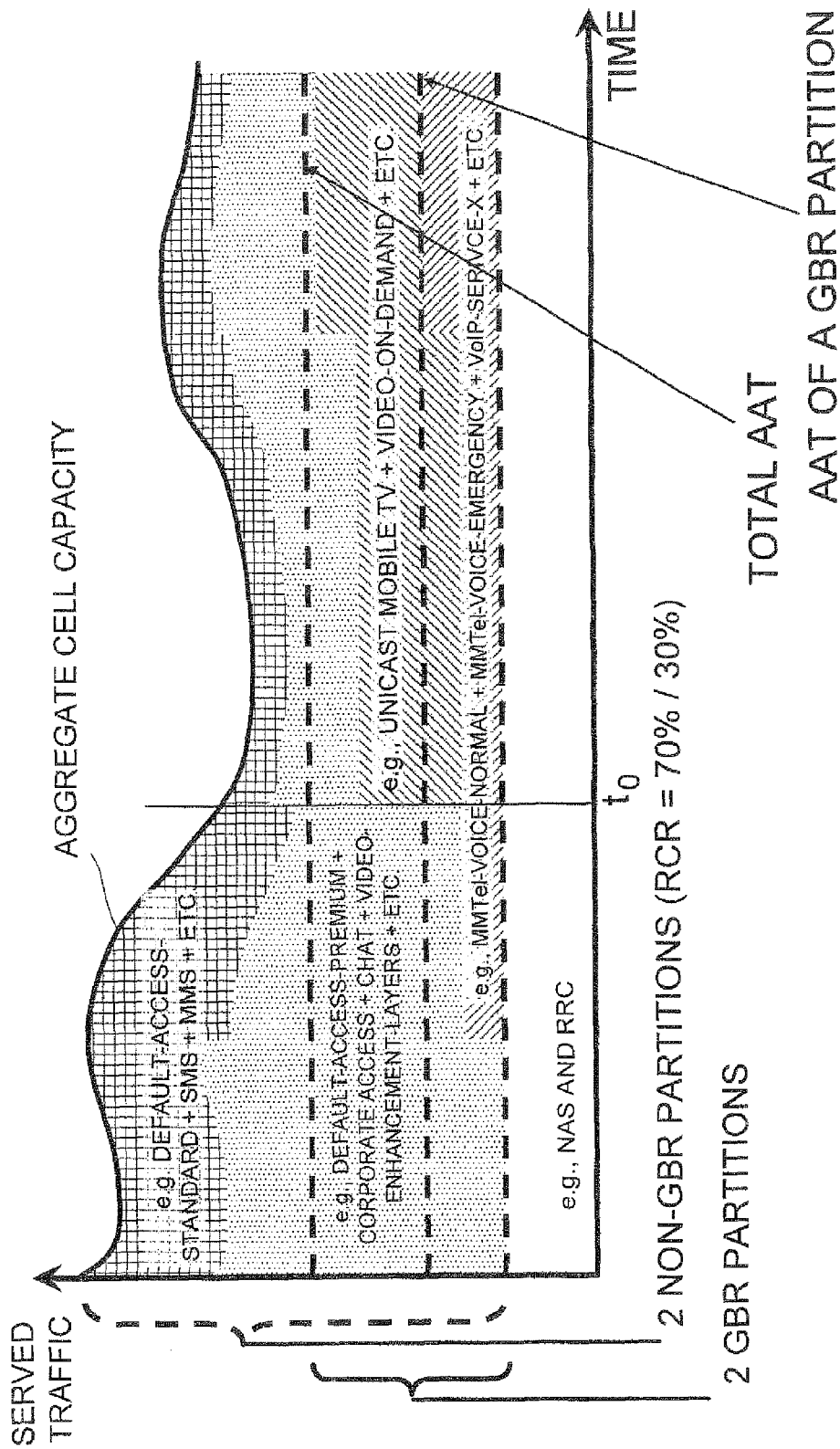
FIG. 7 illustrates another diagram for explaining embodiments of the invention, in particular illustrating changes in GBR traffic load and the consequences for non-GBR capacity.

In FIG. 7, there are two sub-groups related to GBR traffic, one for voice services and the other for video services (hatched sloping left and right, respectively). Both sub-groups can carry traffic up to their respective admission thresholds of the predetermined group capacity with which the sub-groups are associated, wherein admission thresholds are indicated by horizontal broken lines. Accordingly, the individual AATs are associated with different sub-groups, whereas the total AAT is associated with the group or the sum of all the individual AATs of the sub-groups. If there are multiple partitions in the GBR capacity, admission control can preferably be performed on the AAT of the sub-group rather than on the total AAT. Here again, a further partition is reserved for high priority traffic (white), such as signalling, carrying for example NAS and RRC messages, which will not be described further and will be assumed as constant load to simplify the figure.

The non-GBR traffic is also subdivided into two groups, one for standard users (cross-hatched) and the other for premium users (dotted) In total, bearers from the non-GBR traffic can use the part of the aggregate cell capacity remaining after GBR and priority traffic is scheduled. The total capacity remaining for the non-GBR bearers is subdivided between the sub-groups as relative fractions of the remaining capacity. In this example, 70% of the capacity remaining for non-GBR bearers is reserved for premium traffic while the other 30% are for standard traffic. If the capacity for non-GBR traffic is suddenly reduced like at the time $t_0$ in FIG. 7, where video traffic begins to use a part of the total aggregate cell capacity, the subdivision of 70% to 30% of the traffic is maintained so that both partitions have their absolute amounts of traffic correspondingly reduced.

In other words, a part of the predetermined group capacity corresponding to the GBR capacity may be utilized by bearers of the first group associated with the non-GBR partition. As can be seen in FIG. 7, the part of GBR capacity that can be utilized by bearers of the first group corresponds to the difference between the capacity used by the data traffic over GBR bearers and the GBR capacity. In detail, as long as the voice and video services have not started, left part of FIG. 7, both GBR partitions may be utilized by non-GBR traffic of non-GBR services indicated in FIG. 7 (dotted). In general, the term "utilized" describes that traffic uses capacity which may also be reserved for another group or sub-group. This allows in particular for a temporary utilization of otherwise idle capacity and may correspond to dynamically scheduling traffic or dynamically assigning resources. In this case, a scheduler may assign or schedule one or more resource blocks to bearers for one or more transmission time intervals, e.g. every millisecond hundreds of resource blocks, wherein also the GBR capacity may be used for non-GBR bearers carrying non-GBR traffic if the GBR capacity is not fully used by GBR bearers.

In addition to or instead of utilizing a part of the predetermined group capacity, a part of this capacity may also be reallocated, e.g. by reconfiguration by the operator, and also the total AAT may be changed in this way.

In the above examples, it has been described that a capacity associated with the non-GBR partition is time-varying and has been called the time-varying group capacity, since it has been assumed that the total capacity is also time-varying. However, there may be cases, in which the total capacity is not time-varying or only slightly and the time-varying group capacity is time-varying, since as can be seen in FIG. 7, the GBR traffic may also be time-varying.

Figure 8:
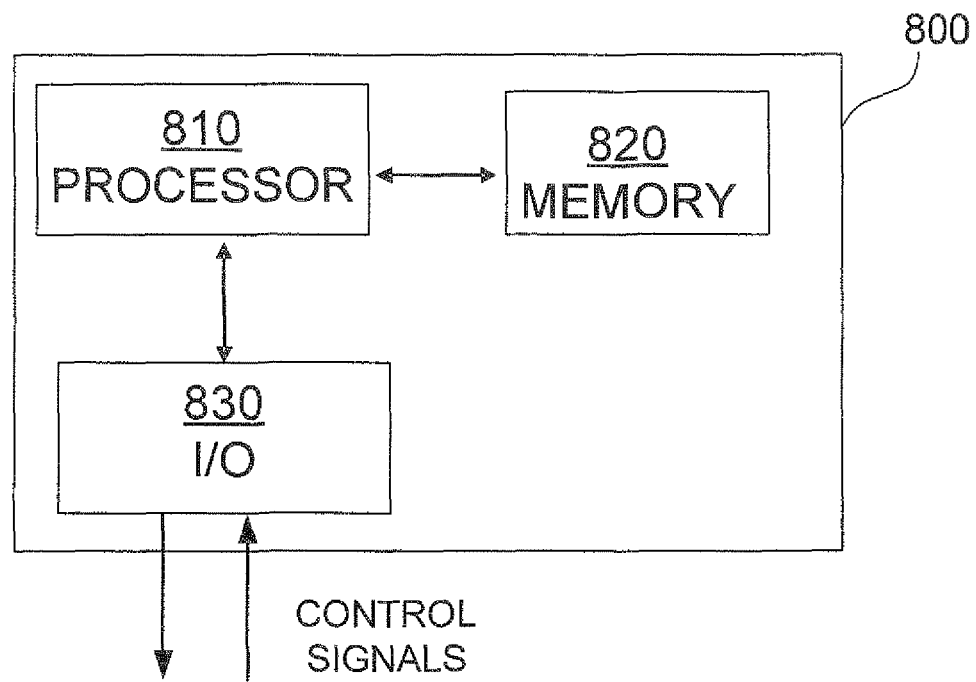
FIG. 8 illustrates a partitioning entity according to another embodiment of the invention.

In the following, FIG. 8 is described. FIG. 8 illustrates elements of a partitioning entity according to another embodiment of the invention. In detail, the partitioning entity 800 of FIG. 8 comprises a processor 810, a memory 820 and an I/O interface 830.

In this general example, the controller 210 and the allocator 220 may be constituted by the processor 810 connected to an appropriate interface, and the processor 810 is adapted to carry out the functions of the controller 210 and the allocator 220 by software and/or hardware. Therefore, the functions may be changed or extended by software update or hardware configuration. The functions performed in the partitioning entity have been described in detail above, and it is referred, in particular, to the discussion of FIG. 2 to avoid unnecessary repetition. The functions of the controller 210 and the allocator 220 may be realized by a microprocessor, computer, field programmable gate array (FPGA) or integrated circuit, such as an ASIC (application specific integrated circuit) but are not limited thereto.

For example, the memory 820 may be any suitable or desirable storage device and may be one or a combination of several of the following components, a RAM, a ROM, a hard disk, an (E)EPROM, a disk, a flash memory, etc. A flash memory may be suitable to export or import program code. The program code stored in the memory 820 may be a program including instructions adapted to cause the processor 810 to carry out the different method steps described above.

The I/O interface 830 may be adapted to receive control signals from the network. Further, other information may be obtained through the I/O interface 830, such as information necessary to monitor or calculate the capacity and traffic of the system. For example, the partitioning entity 800 may be incorporated in a radio base station, as described above.

It will be appreciated by those skilled in the art that the processor and its functions can also be integrated in or disturbed over other nodes or systems, and the above described methods may be implemented on a data processing computer, such as a personal computer, work station computer, mainframe computer or other suitable computer.

According to another embodiment, a program may be provided including instructions adapted to cause a data processor, such as processor 810, that may be part of the controller 210 to carry out combinations of the above-described method steps.

The program or elements thereof may be stored in a memory, for example the memory 820 of FIG. 8, and retrieved by the data processor for execution.

Moreover, a computer readable medium may be provided in which the program is embodied. The computer readable medium may be tangible, such as a disk or other data carrier or may be constituted by signals suitable for electronic, optic or any other type of transmission. A computer program product may comprise the computer readable medium.

As described above, the discussed embodiments and examples of the invention allow for partitioning of capacity and allow for a combination of GBR and non-GBR in a system with typically time-varying total capacity, such as in a packet-switched cellular network. Furthermore, means have been provided to avoid resource starvation of lower priority non-GBR services. Therefore, simple and effective means have been provided to increase the reliability of services in a packet-switched cellular network.

It will be apparent to those skilled in the art that various modifications and variations can be made in the entities and methods of the invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A method implemented by a partitioning entity of a communication network for partitioning a total capacity of the communication network among communication links, the method comprising:
at the partitioning entity, assigning communication links to a first group associated with a time-varying group capacity to form a first group of communication links, the first group comprising a first subgroup and a second subgroup;
at the partitioning entity, allocating a non-zero fraction of said time-varying group capacity to said first sub-group, and
at the partitioning entity, allocating a predetermined group capacity to a second group of communication links.

2. The method of claim 1, further comprising allocating a non-zero fraction of said time-varying group capacity to said second sub-group.

3. The method of claim 1, wherein said predetermined group capacity is limited by a defined threshold.

4. The method of claim 1, wherein capacity not allocated to said second group is available for allocation to said first group.

5. The method of claim 1, wherein the first group further comprises a third subgroup, and wherein the method further comprises allocating a portion of said predetermined group capacity to said third subgroup, said portion corresponding to a specified absolute amount of said predetermined group capacity.

6. The method of claim 1, wherein said time-varying group capacity corresponds to the difference between said total capacity and said predetermined group capacity.

7. The method of claim 1, further comprising utilizing a part of said predetermined group capacity by communication links of said first group, wherein the utilized part corresponds to the difference between data traffic over communication links of said second group and the predetermined group capacity.

8. The method of claim 1, wherein a communication link is associated with at least one parameter, and the method further comprises assigning the communication link to one of the sub-groups based upon the parameter.

9. The method of claim 1, wherein communication links assigned to said first group are not associated with a guaranteed bit rate and communication links assigned to said second group are associated with a guaranteed bit rate.

10. The method of claim 1, wherein the capacity of the communication network is dependent on network resources and the location of mobile stations using the communication network, the network resources comprising at least one of radio resources, processing resources, and resource blocks.

11. The method of claim 1, wherein said allocating is performed dynamically or repeatedly at predetermined time intervals or based on changes in the capacity.

12. The method of claim 1, wherein said communication network is a packet-switched mobile network.

13. A partitioning entity of a communication network configured to partition a total capacity of the communication network among communication links, the partitioning entity comprising:
- a controller for assigning communication links to a first group associated with a time-varying group capacity to form a first group of communication links, the first group comprising a first sub-group and a second sub-group; and
- an allocator configured to allocate a non-zero fraction of said time-varying group capacity to said first sub-group and to allocate a predetermined group capacity to a second group of communication links.

14. The partitioning entity of claim 13, wherein the allocator is further configured to allocate a non-zero fraction of said time-varying group capacity to said second sub-group.

15. The partitioning entity of claim 13, wherein said predetermined group capacity is limited by a defined threshold.

16. The partitioning entity of claim 13, wherein capacity not allocated to said second group is available for allocation to said first group.

17. The partitioning entity of claim 13, wherein the first group further comprises a third subgroup, and wherein the allocator is further configured to allocate a portion of said predetermined group capacity to said third subgroup, said portion corresponding to a specified absolute amount of said predetermined group capacity.

18. The partitioning entity of claim 13, wherein said time-varying group capacity corresponds to the difference between said total capacity and said predetermined group capacity.

19. The partitioning entity of claim 13, wherein a communication link is associated with at least one parameter, and wherein the controller is configured to assign the communication link to one of the sub-groups based upon the parameter.

20. A computer program product stored on a non-transitory computer-readable medium and comprising computer program instructions that, when executed by a data processor, cause the data processor to partition a capacity of a communication network among communication links, the computer program instructions causing the data processor to:
- assign communication links to a first group associated with a time-varying group capacity to form a first group of communication links, the first group comprising a first subgroup and a second sub-group;
- allocate a non-zero fraction of said time-varying group capacity to said first sub-group, and
- allocate a predetermined group capacity to a second group of communication links.

\* \* \* \* \*

UNITED STATES PATENT AND TRADEMARK OFFICE
CERTIFICATE OF CORRECTION

PATENT NO. : 8,542,584 B2
APPLICATION NO. : 12/993385
DATED : September 24, 2013
INVENTOR(S) : Ludwig et al.

Page 1 of 1

It is certified that error appears in the above-identified patent and that said Letters Patent is hereby corrected as shown below:

In the Specification

In Column 1, Line 20, delete "S. Blake at al," and insert -- S. Blake et al., --, therefor.

In Column 2, Line 58, delete "e.q." and insert -- e.g. --, therefor.

In Column 3, Line 10, delete "entity" and insert -- entity to --, therefor.

In Column 12, Line 34, delete "standarized" and insert -- standardized --, therefor.

In Column 14, Line 20, delete "(dotted)" and insert -- (dotted). --, therefor.

Signed and Sealed this
Eighth Day of July, 2014

Michelle K. Lee
*Deputy Director of the United States Patent and Trademark Office*